(12) United States Patent
Ritter et al.

(10) Patent No.: US 6,976,171 B1
(45) Date of Patent: Dec. 13, 2005

(54) IDENTIFICATION CARD AND IDENTIFICATION PROCEDURE

(75) Inventors: Rudolf Ritter, Zollikofen (CH); Walter Heutschi, Jedenstorf (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/530,867

(22) PCT Filed: Nov. 7, 1997

(86) PCT No.: PCT/CH97/00425

§ 371 (c)(1),
(2), (4) Date: Jul. 6, 2000

(87) PCT Pub. No.: WO99/25140

PCT Pub. Date: May 20, 1999

(51) Int. Cl.[7] ............................................. G06F 9/00
(52) U.S. Cl. ..................... 713/193; 713/201; 713/202
(58) Field of Search ................................ 713/193, 200, 713/201, 202

(56) References Cited

U.S. PATENT DOCUMENTS

| | | | | |
|---|---|---|---|---|
| 5,329,573 A | * | 7/1994 | Chang et al. | 455/411 |
| 5,396,543 A | * | 3/1995 | Beeson et al. | 455/560 |
| 5,604,789 A | * | 2/1997 | Lerman | 455/454 |
| 6,332,579 B1 | * | 12/2001 | Ritter | 235/492 |
| 6,543,686 B1 | * | 4/2003 | Ritter | 235/380 |
| 6,696,973 B1 | * | 2/2004 | Ritter et al. | 340/825.72 |
| 6,829,593 B1 | * | 12/2004 | Ritter et al. | 705/51 |
| 6,859,650 B1 | * | 2/2005 | Ritter | 455/406 |

FOREIGN PATENT DOCUMENTS

| | | |
|---|---|---|
| DE | 41 18 993 | 12/1992 |
| DE | 41 18 993 A1 | 12/1992 |
| EP | 0 689 368 | 12/1995 |
| EP | 0 689 368 A1 | 12/1995 |
| EP | 0 786 915 | 7/1997 |
| EP | 0 786 915 A2 | 7/1997 |
| WO | 94 30023 | 12/1994 |
| WO | WO 94/30023 | 12/1994 |
| WO | 96 38814 | 12/1996 |
| WO | WO 96/38814 | 12/1996 |

OTHER PUBLICATIONS

Yamaguchi, Ota, Ito, Ohashi, Watanabe: "Inter-system mobility and service management in GSM/PDC roaming." GLOBECOM 97. IEEE Global Telecommunications Conference, No. 2, Nov. 3-8, 1997, New York, NY, USA, pp. 694-698, XP002072594.

(Continued)

Primary Examiner—Norman M. Wright
(74) Attorney, Agent, or Firm—Oblon, Spivak, McClelland, Maier & Neustadt, P.C.

(57) ABSTRACT

The invention concerns a SIM (subscriber identity module) card (1) for a subscriber on a GSM mobile radio (2) comprising a contact zone (11) to be connected with a mobile apparatus (13, 14) and electronic storage means (10) containing parameters for identifying subscribers of said mobile radio network. Said storage means can also contain one or several other identification parameters, whereby the subscribers of other systems can be identified in these other systems. The other system can accede, for example by an inductance coil (12), to said other identification parameters. The additional identification parameters can be reloaded or modified by remote control from a SIM server (3). Preferably, said parameters are transmitted by short TTP coded messages SMS, between the SIM server and the SIM cards. The invention provides the following advantage: with a single SIM card, the subscriber can be identified, for example, in a computer network, in an automatic TV payment system or in a permanent network in a financial institution or in a communication management system.

34 Claims, 4 Drawing Sheets

OTHER PUBLICATIONS

Lantto J: "Roaming Between Cellular Standards" ISS '95. World Telecommunications Congress. (International Switchin Symposium), Advanced Switching Technologies for Universal Telecommunications at the Beginning of the 21st. Century Berlin, Apr. 23-28, 1995, vol. vol. 1, No. Symp. 15, Apr. 23, 1995, Verband Deutscher Elektrotechniker (VDE) et al., pp. 241-245, XP000495572.

Mazziotto G: "The Subscriber Identity Module for the European Digital Cellular System GSM and Other Mobile Communication Systems" Proceedings of the International Switching Symposium, Yokohama, Oct. 25-30, 1992, vol. vol. 1, No. Symp. 14, Oct. 25, 1992, Institute of Electronics; Information and Communication Engineers, pp. 113-116, XP000337627.

Yamaguchi et al., "Inter-system Mobility and Service Management in GSM/PDC Roaming", GLOBECOM 97. IEEE Global Telecommunications Conference., Nr. 2, 3-8. Nov. 1997, New York, NY, USA, Seiten 694-698, XP002072594.

Lantto J., "Roaming Between Cellular Standards", ISS '95. World Telecommunications Congress. (International Switchin Symposium), Advanced Switching Technologies for Universal Telecommunications at the Beginning of the 21st. Century Berlin, Apr. 23-28, 1995,Bd. vol. 1, Nr. Symp. 15, Apr. 23, 1995, Verband Deutscher Elektrotechniker (VDE) et al., Seiten 241-245, XP000495572.

Mazziotto, "Diversification and Integration of Networks and Swithching Technologies Towards the 21st Century", International Switching Symposium 1992, Oct. 25-30, 1992, vol. 1, p. B2.2.

"Digital Cellular Telecommunications System (Phase 2+); Specification of the Subscriber Identity Module-Mobile Equipment (SIM-ME) Interface; (GSM 11.11) ETSI", Global System for Mobile Communications, Dec. 1995, pp. 1-86.

"Digital Cellular Telecommunications System (Phase 2+); Spedification of the SIM Application Toolkit for the Subscriber Identity Module-Mobile Equipment (SIM-ME) Interface; (GSM 11.14)", GSM Technical Specification, Feb. 1996, pp. 1-47.

* cited by examiner

IDENTIFICATION CARD AND IDENTIFICATION PROCEDURE

This invention relates to an identification card and an identification method. The invention relates particularly, but not exclusively, to a chip card to identify subscribers in an electronic data processing system or in a telecommunications system.

Numerous systems require identification of users (called subscribers here) in order, for example, to access protected data, to order services or products, to make transactions or to gain access to protected zones. Computer networks, mobile radio networks, pay TV systems, access control devices, point-of-sale (POS) terminals, data bases, etc., can be mentioned as examples of such systems.

A well-known method to identify subscribers uses a public alphanumerical identification and a secret password which every subscriber is asked to give. This often employed method is slow and tedious for the subscriber, who has to type in a lot of symbols manually to identify himself. Moreover this method does not offer a high degree of security since passwords, as is well known, can be observed or found out.

A more secure method requires subscribers to show an object which is difficult to copy, such as, for example, a key or a chipcard, to identify themselves. An object is of course harder to steal than a password, and its disappearance is usually noticed quickly so that access to the system can be blocked immediately. Often a password is also required in addition to the key or the chipcard.

An identification chipcard usually contains identification parameters, which are usually written in a protected memory area of the chipcard during the personalization of the chipcard. The personalization of the card takes place usually at the service provider, for example, a branch of a bank in the case of an automatic teller card. It is therefore not possible, generally speaking, to supplement the identification parameters or to change them without replacing the card or at least without bringing the card to the service provider.

Since the number of systems requiring an identification of the subscriber continues to grow, subscribers are forced to possess more and more identification cards to identify themselves, for example, at automatic teller machines, at access control installations or in various telecommunications systems. Most cards require moreover a different password from the user. This identification method is therefore not practical, and requires users to remember many different passwords.

Proposed in the patent application WO 96/38814 is a chip card having an interface with a contact and an interface without a contact, which card has different memory areas for coupling via these different interfaces so that the card can carry out different functions, for example the function of a telephone value card and the function of a ticket.

Proposed in the patent application EP 786 915 A2 is a SIM (Subscriber Identification Module) card in which identical identification numbers are stored several times in order to identify the respective subscriber in several mobile networks.

Described in the patent application WO 94/30023 is a method of loading data and/or applications onto a SIM card via an air interface so that the card is provided with additional services and can be used as a multi-service card.

One object of the present invention is to propose improved identification cards, identification methods and identification systems.

According to the present invention, these objects are attained in particular through the features of the characterizing part of the independent claims. Further preferred embodiments follow, moreover, from the dependent claims and from the specification.

In particular, these objects are attained through a SIM (Subscriber Identity Module) chipcard, for example by means of a SIM chipcard as defined in the tech-nical specification GSM 11.11 or GSM 11.14, which has been available since 1995, or respectively 1996, from the Secretariat of the European Telecommunications Standards Institute, F-06921 Sophia Antipolis (France).

SIM cards are used in mobile radio networks, such as, for example, in the GSM (Global System for Mobile Communications) network to store the identity of the subscribers. Entailed is a removable chipcard, so the user can receive the calls intended for him on the mobile device of his choice by transferring the SIM card from one device to another. The mobile stations (MS), such as, for example, GSM cellular telephones, are therefore made up of two elements, the mobile device and the SIM chipcard.

SIM cards exist today in two standard formats. The full-size format corre-sponds to the size of a credit card, whereas the plug-in format, which is adapted especially to the miniaturized, mobile telephones, is approximately 25 mm by 10 mm. The functions of the cards in these two formats are identical.

The SIM cards generally contain data processing means, usually a micro-controller integrated into a chip. This micro-controller contains a memory area, usually an EEPROM, which allows programs and/or data files to be stored, as well as processing means which are able to execute various algorithms, in particular algorithms which allow subscriber identification and communication encryption to be carried out.

The processing means have access to programs and to data files in the memory area of the card. These files comprise in particular a subscriber identification IMSI (International Mobile Subscriber Identity), which is stored in a file EFIMSI on the card, and which identifies the subscriber in a GSM mobile telephone network.

According to the invention, the SIM card comprises one or more additional new data files in the microcontroller's memory area, which contain identification parameters to identify the subscribers to other systems in these other systems.

With these additional identification parameters the SIM chipcard can be used not only to identify the subscriber in another mobile radio network, but also to identify him in various other systems.

According to another aspect of the invention, these additional identification parameters are communicated from a server connected to an SIM server to the SIM card of the subscriber.

It is definitely possible to add identification parameters for new systems at any time in order to extend the application possibilities of already distributed SIM cards. The identification parameters for any system and in any already distributed SIM card can also be supplemented or changed remotely at any time.

The present invention will be better understood with the aid of the following description, which is given as an example and is illustrated by these figures.

Figure 1:
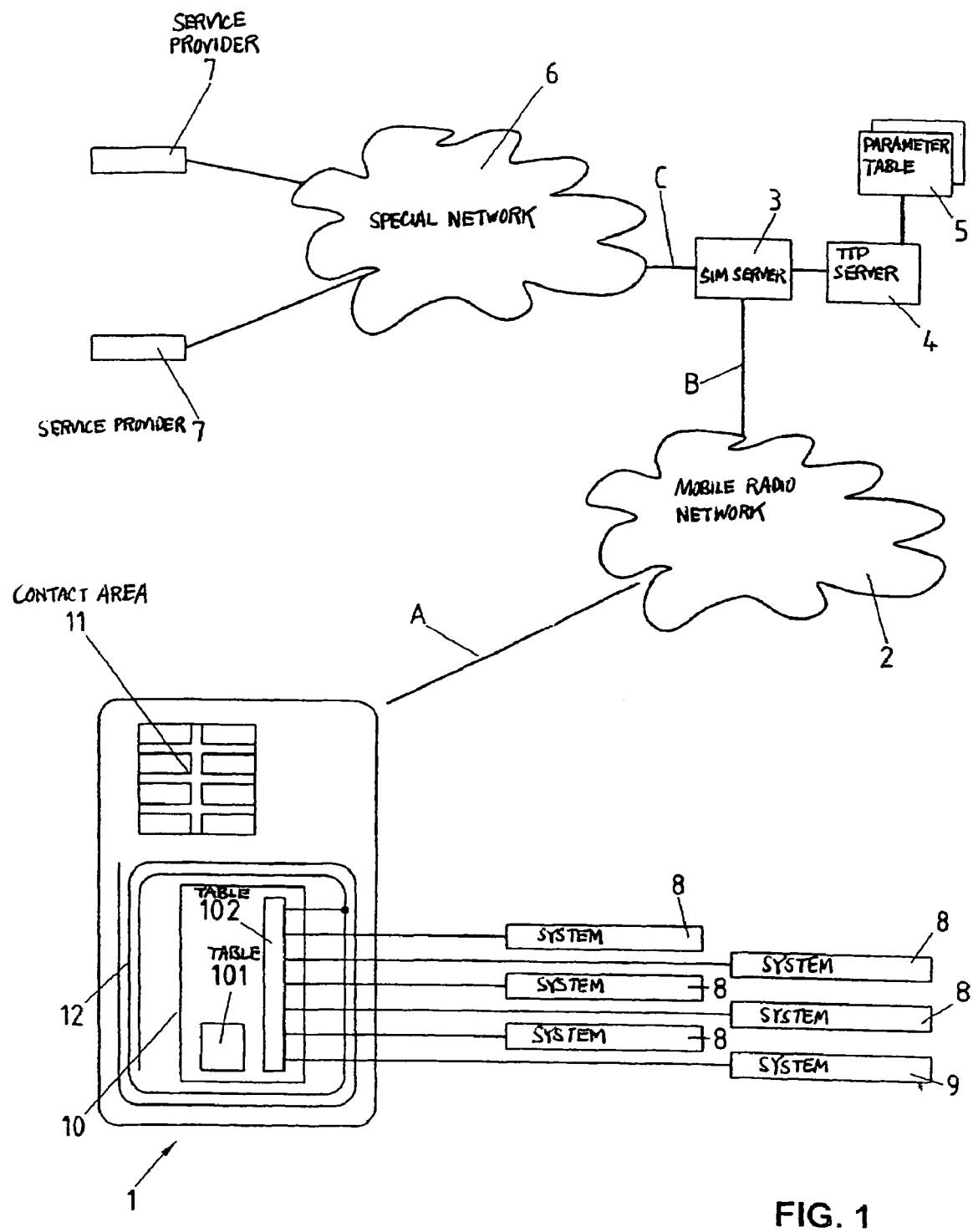
FIG. 1 is a block diagram showing a system according to the invention.

The system shown in FIG. 1 comprises a SIM chipcard 1, as is already being used in, among other things, GSM (Global System for Mobile Communications), DECT (Digital European Cordless Telephone System), DCS (Digital Cordless System) or PCS mobile devices, or also in future fixed networks with subscriber identification through chipcards. The SIM card can be either a full-size card or a plug-in card. By means of a contact area 11 on the surface of the card, it can be connected to a terminal (not shown), for example a mobile telephone, a PC, a laptop or a palmtop. The card contains data processing means 10, for example a microcontroller integrated into a chip.

A memory area, preferably an EEPROM, is contained in the microcontroller 10 or is connected thereto. The memory area contains programs and data files, which are arranged in a hierarchical directory structure. The data files comprise, among other things, elementary files (EF), such as are defined in the above-mentioned technical specification GSM 11.11 or GSM 11.14.

According to the invention, the SIM card 1 contains in addition one or more new tables 101 and 102 in the memory area of the microcontroller 10. These is additional tables contain identification parameters in order to identify the subscriber in other systems. The tables, which will be described more closely later with reference to FIG. 2, can be contained in one or more elementary files EF in the memory area of the chipcard 1. The other systems could be, for example, a mobile network, a fixed network or a WWW network, a computer network (NC, network computer), such as, for example, an internet, an intranet or an extranet, a pay TV system, a pay radio system, a traffic routing system (GPS, TPS), a bank, a point-of-sale (POS) terminal, etc. Depending upon the identification parameters in the tables, the subscriber can be identified in all these systems using a single card 1.

The memory area of the microcontroller 10 comprises moreover one or more new EXE data files (program) to administer these additional identification parameters. The memory area preferably contains new software modules in order to access the identification parameters in the received SMS short messages and to store these received identification parameters.

The SMS card preferably further contains an induction coil 12, in order to be able to communicate in a contactless way with external devices. The SIM microcontroller in this case will be preferably supplemented by another electronic module (not shown), which is connected to the coil 12 and which is responsible for the contactless communication with an external device.

The SIM card preferably contains in addition known means to transmit and receive SMS short messages, as well as known filter means to recognize and interim store special short messages, preferably according to the SICAP (SIM CARD Application Platform) method, which is described in the patent EP 0 689 368 B1, among others. Encryption and signing means are provided moreover in order to decrypt the received SMS messages and to encrypt and sign the transmitted SMS messages. As an encryption method, the TTP (Trusted Third Party) method can be used, for example, or an encryption method which works according to a point-to-point process.

The SIM card 1 is connected to a mobile radio network, for example a GSM network, when inserted into a mobile device (not shown). A SIM server 3 for administration of short messages (SSC, Short Message Service Center) is likewise connected to the network 2. The SIM server 3 is equipped in such a way that it can communicate with the SIM card 1 over the mobile radio network by means of special SMS short messages. The known filter means in the SIM server and in the SIM cards enable special services, such as the exchange of data, instructions and programs between the SIM server and an SIM card to be performed.

A TTP server 4 is also connected to the SIM server 3 in order to encrypt at least certain special SMS short messages and thereby ensure that the confidentiality, authenticity of identity and authenticity of information, integrity and indisputableness of origin are guaranteed. As already mentioned, a point-to-point encryption and signing can also be used.

Various service providers 7 are connected to the SIM server 3 through the mobile radio network 2 or through a special network 6. The special network 6 can be, for example, an internet, intranet or extranet, or also a X25 network. The service providers administer the mentioned other systems 8.

In order to identify himself to a service provider 7 and in order to use the system offered by this provider, the subscriber must identify himself beforehand with the identification parameters available in his chipcard, for example with a password stored in the card 10. According to the invention, identification parameters for various systems are stored in the memory area of a single SIM card 1. Different systems can access the required identification parameters through a kind of virtual bus in the SIM card 1. The service provider puts, for this purpose, the necessary parameters in a table 5 to which the SIM server 3 has access. The parameter table is preferably stored in the SIM server 3. It contains the parameters for each subscriber and for each system 8.

The SIM server 3 carries out the data management between the service provider 7, the table 5 and the SIMs 1. The communication takes place encrypted. Via SIM server 3, each service provider 7 has access to a memory area 101, 102, of the SIM cards 1 subscribing to the system 8 of that service provider; in this memory area he can put the necessary parameters for use of his system. These parameters are communicated by the SIM server 3 and by means of special SMS short messages.

The SIM server 3 draws up and manages the parameter table 5. The parameter table 5 contains a copy of all identification parameters communicated to the subscribers.

Figures 2A, 2B:
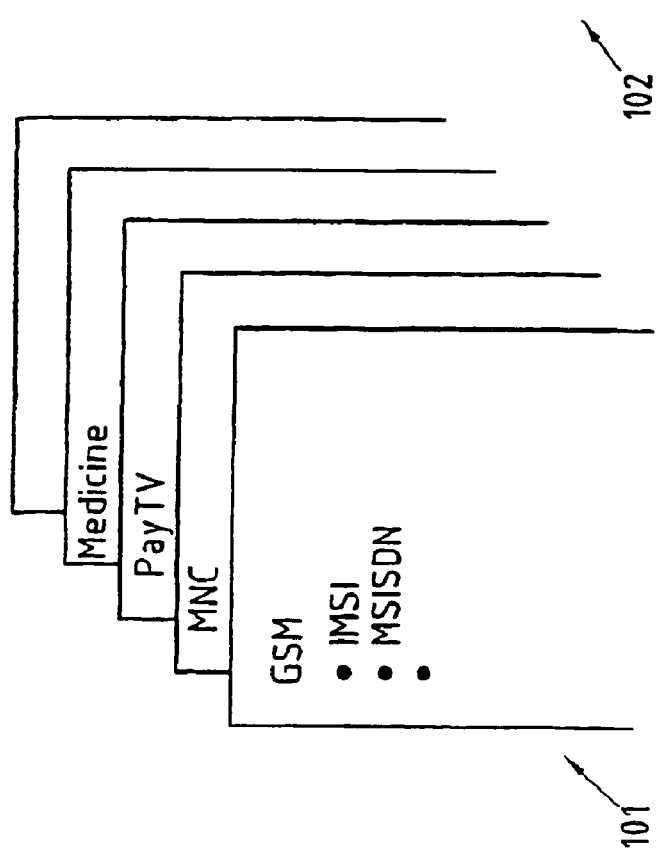
FIGS. 2a and 2b show two different parameter tables in the SIM card, based on two different organization variants.

FIG. 2 shows two different possibilities of storing identification parameters in the memory area of the SIM card 10. These parameters can be stored, for example, in different tables 101, as is indicated diagrammatically in FIG. 2a. A table corresponds then to a service or system, to which the subscriber has subscribed. A table can then contain, for example, the parameters which allow the card to be used as an identifying SIM card in a GSM network, whereas a second table contains the identification parameters for a computer network, and a third contains the identification parameters for a pay TV system, etc. These different tables can be stored in a single EF data file, or preferably each table in a different data file. In the latter case a new data file must be created each time a subscriber subscribes to a new system.

It is also possible, however, to store identification parameters for different systems in a single table 102, as shown diagrammatically in FIG. 2b. This table 102 then contains a first area 1020, which indicates the common parameters x, y, z for each system—for example, the name of the subscriber. Other areas 1021, 1022, 1023, etc. contain, on the other hand, the parameters a, b, . . . , f . . . specific to each system subscribed to. For example, the area 1021 gives the identification parameters IMSI (International Mobile Subscriber Identity) and MSISDN (Mobile Station Identity Number), with which the subscriber to a GSM network can be identified, and the area 1022 contains parameters to identify him in a MNC network, etc.

The SIM card 1 parameterized in this way can be used in different systems in that, for example, it is inserted directly into a card reader of that system—for example into an automatic teller machine in the case of a banking system. The card reader can then access the required identification parameters through the contact area 11 on the card. The card reader can, for example, have direct access to the respective memory area 1022, 1023, etc.

In a preferred variant, however, the systems 8 can access the identification parameters a, b, . . . only through the data processing means 10 in the card. Preferably in this case each system is ensured access to the parameters as if the individual systems were isolated (virtual bus).

Certain systems require the identification parameters to be introduced according to a predefined protocol. For example, the card reader during subscriber identification often makes a number of inquiries to the chipcard, which the card must respond to in accordance with the respective identification parameters. This protocol can be executed by the processor on the card, which is specially programed for this purpose with a specific program in the memory area of the card.

If a system requires of the card that it executes a system-specific, otherwise not available identification protocol, it is possible, according to the invention, for the EXE file needed to carry out this protocol to be communicated to the card. This program is preferably communicated by means of special SMS short messages through the network 2, in the same way as normal identification parameters. As soon as the SIM card has recognized that it is located in a card reader which requires such an identification protocol, then it executes the respective program immediately. The SIM card then acts as a normal identification card of this system. The protocol program is preferably programmed in the JAVA language.

The identification parameters can contain, for example, a public identification (name, country, ID, etc.) and a secret password of the subscriber. It is however also possible to store any other parameter, depending upon the subscribed-to system. For example, biometric parameters can also be stored, such as, for example, voice parameters, facial features or retinal patterns of the subscriber. The parameter tables 101, 102 can also contain, however, all other parameters or data used for the identification protocol.

Figure 3:
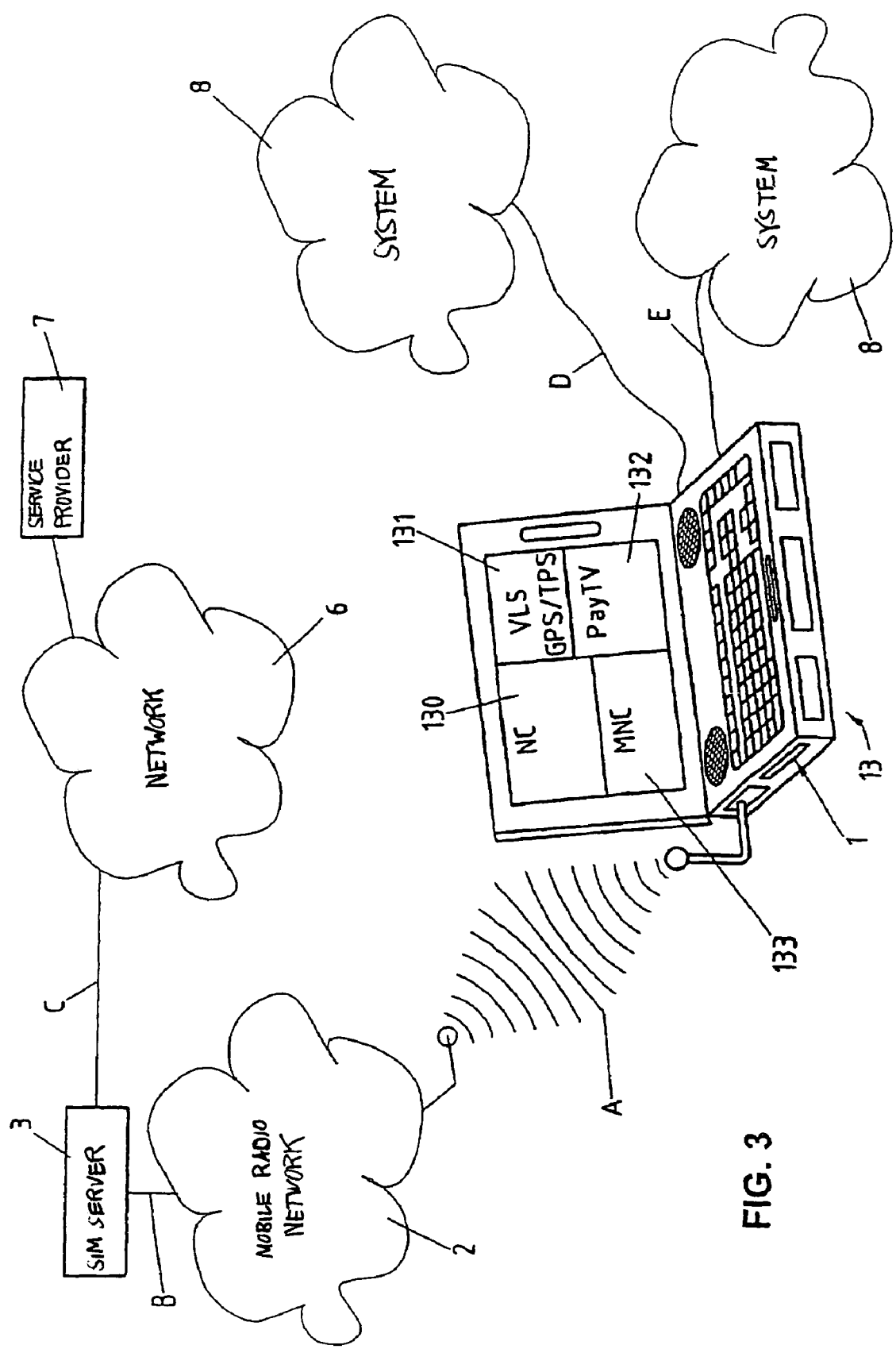
FIG. 3 is a block diagram of a variant of the invention in which the terminal device of the subscriber is a mobile computer, which can be connected to different systems.

FIG. 3 is a block diagram of a variant of the invention, in which the terminal device of the subscriber is a mobile computer 13, which can be connected to different systems 8. The mobile computer 13 comprises a chipcard reader in order to be able to read in particular SIM chipcards 1. Various applications in the computer 13 enable it to be connected to different systems, for example to a computer network, to an internet, to an intranet, or to an extranet, or to a pay TV network. These application programs, with which the computer can be connected to the various external systems, can all be executed by this computer and, in a multi-tasking operating system, for example, can be shown at the same time in a plurality of windows 130, 131, 132, 133 on the screen of the mobile computer. The connection to these different systems is achieved with suitable connection means D, E, for example with the aid of a modem and/or a network adapter.

The mobile computer 13 comprises moreover means to connect it to a mobile radio network 2, these means being integrated into the computer 13 or being located outside this computer. In this way the service providers 7 of the various systems 8 can communicate identification parameters and identification protocol programs in the SIM cards 1 of their subscribers through a network 6 and a SIM server 3, as described above. These identification parameters are moreover copied in the table 5, to which the SIM server 3 has access. The various messages A, B, C between the service providers, the SIM server 3 and the terminal 1 are preferably encrypted and signed by mean of TTP, as described above.

The subscriber equipped with the mobile computer 13 can use various applications to the different systems 8, the connection requiring the reading of corresponding identification parameters on the SIM card 1, and, should the situation arise, execution of an identification protocol program stored on the card 1, as described above.

Figure 4:
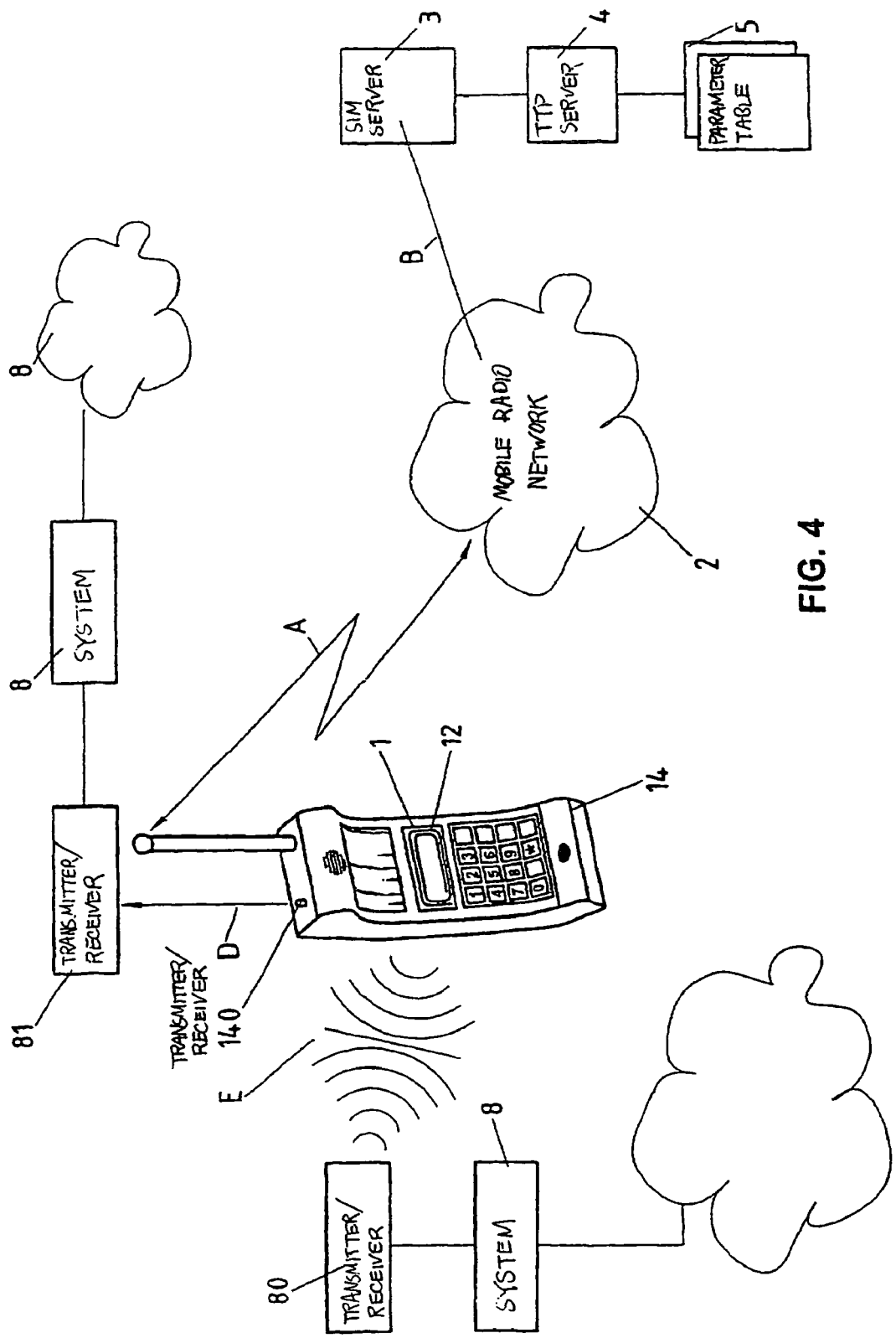
FIG. 4 is a block diagram of another variant of the invention in which the terminal device of the subscriber is a mobile telephone which can be connected to different systems.

FIG. 4 is a block diagram of a variant of the invention in which the terminal device of the subscriber is a mobile telephone 14, which can be connected directly to various systems 8 through different interfaces 12, 140. These additional interfaces comprise, for example, an induction coil 12 in the SIM card 1, with which the SIM card 1 can communicate in a contactless way with an external system 8. For this purpose, the system 8 is also connected to an inductive transmitter-receiver 80. The mobile device 14 can also communicate through an optional infrared transmitter-receiver 140 in a contactless way with a transmitter receiver 81 connected to a system 8. Other means to connect the mobile telephone 14 to other systems can also be used within the framework of the invention. For example, the mobile telephone can be connected to external systems through the normal mobile radio network 2 or by means of a connector.

The service providers 7 of the various systems 8 connected to the SIM server 3 through a network (not shown) can subsequently load identification parameters and possibly identification protocol programs into the SIM cards of their subscribers through the SIM server 3, as described above. These identification parameters are moreover copied into the table 5, to which the server 3 has access. The various messages A, B, C between the service providers, the SIM server 3 and the mobile device 14 are preferably encrypted by means of TTP.

With the identification parameters stored in the mobile device 14, the subscriber can identify himself in the various systems 8 in order to use these systems.

Advantageous with this invention is that the various service providers 7 can control the services they offer as needed. Since, for administration of parameters, there exists only one interface to the SIM cards 1, mechanisms for billing of all the networked systems can easily be set up.

In an embodiment variant, the identification card 1 comprises several contact areas in order to connect it to various systems 8.

What is claimed is:

1. An identification card for a subscriber to a mobile radio network, comprising:

a contact area configured to couple to a mobile device; and a memory area coupled to the contact area and including,
- a first identification parameter for identification of the subscriber in the mobile radio network,
- a second identification parameter for identification of the subscriber in another system that is not a mobile radio network, the second identification parameter including a parameter that is specific to the other system, and
- a system-dependent identification protocol program configured to introduce to the other system the second identification parameter according to a system-specific identification protocol.

2. The identification card according to claim 1, wherein the memory area includes a single table storing the first identification parameter and the second identification parameter.

3. The identification card according to claim 1, wherein the first identification parameter and the second identification parameter are stored in different tables in the memory area.

4. The identification card according to claim 1, wherein the second identification parameter is accessible through the contact area.

5. The identification card according to claim 1, further comprising:
- a plurality of contact areas configured to respectively couple to at least one of the other system and other different systems.

6. The identification card according to claim 1, further comprising:
- an induction coil configured to allow access to the second identification parameter.

7. The identification card according to claim 1, further comprising:
- means for communicating with a SIM server in the mobile radio network through SMS messages;
- means for accessing identification parameters in the SMS messages; and
- means for storing the identification parameters in the memory area.

8. The identification card according to claim 7, further comprising:
- means for decrypting the SMS messages.

9. The identification card according to claim 8, wherein the means for decrypting decrypts the SMS messages according to a TTP method.

10. The identification card according to claim 8, wherein the means for decrypting decrypts the SMS messages according to a point-to-point method.

11. The identification card according to claim 1, wherein, the other system is a computer network, and the second identification parameter permits an identification of the subscriber in the computer network.

12. The identification card according to claim 1, wherein, the other system is a pay TV system, and the second identification parameter permits an identification of the subscriber in the pay TV system.

13. The identification card according to claim 1, wherein, the other system is a fixed network, and the second identification parameter permits an identification of the subscriber in the fixed network.

14. The identification card according to claim 1, wherein the second identification parameter permits an identification of the subscriber at a financial institution.

15. The identification card according to claim 1, wherein, the other system is a traffic routing system, and the second identification parameter permits an identification in the traffic routing system.

16. The identification card according to claim 1, wherein the identification card is arranged as a GSM-SIM card.

17. The identification card according to claim 1, wherein at least one of the first identification parameter and the second identification parameter includes a biometric identification parameter.

18. The identification card according to claim 1, further comprising:
- the system-dependent identification protocol stored in the memory area; and
- means for executing the system-dependent identification protocol.

19. A mobile radio system comprising:
- a SIM server; and
- a multiplicity of mobile devices configured to be connected to the SIM server through a mobile radio network, at least one of the mobile devices containing an identification card including,
- a contact area configured to couple to the respective mobile device, and
- a memory area coupled to the contact area and including,
  - a first identification parameter for identification of a subscriber to the mobile radio network within the mobile radio network,
  - a second identification parameter for identification of the subscriber in another system that is not a mobile radio network, the second identification parameter including a parameter that is specific to the other system, and
  - a system-dependent identification protocol program configured to introduce to the other system the second identification parameter according to a system-specific identification protocol.

20. The mobile radio system according to claim 19, wherein the first identification parameter and the second identification parameter are stored in at least one table of the memory area, the at least one table being accessible to the SIM server, and the first identification parameter and the second identification parameter being transferable into the memory area via the at least one table.

21. The mobile radio system according to claim 20, wherein the first identification parameter and the second identification parameter are stored in the memory area in a single table.

22. The mobile radio system according to claim 19, wherein the first identification parameter and the second identification parameter are stored in the memory area in different tables.

23. The mobile radio system according to claim 19, wherein the second identification parameter is accessible through the contact area when the identification card is inserted in a device connected to the other system.

24. The mobile radio system according to claim 19, wherein the identification card includes a plurality of contact areas configured to respectively couple to at least one of the other system and other various systems.

25. The mobile radio system according to claim 19, wherein the identification card includes an induction coil configured to allow access to the second identification parameter.

26. The mobile radio system according to claim 19, wherein the at least one mobile device includes an infrared interface configured to allow communication of the second identification parameter to at least one of the other system and other external systems.

27. The mobile radio system according to claim 19, wherein, the at least one mobile device is configured to communicate with the SIM server through SMS messages, and identification parameters stored in the SMS messages are accessible for storing in the memory area.

28. The mobile radio system according to claim 19, wherein at least one of the first identification parameter and the second identification parameter includes a biometric identification parameter.

29. The mobile radio system according to claim 19, wherein, the system-dependent identification protocol is included in the memory area, and the identification card includes means for executing the system-dependent identification protocol.

30. A method of identifying a subscriber of a mobile radio network, comprising:

storing in a server an identification parameter and a system-specific identification protocol program, with which the subscriber can be identified in another system that is not a mobile radio network;

communicating the identification parameter and the system-specific identification protocol program from the server to an identification card of the subscriber via the mobile radio network, the identification card being coupled through a contact area of the identification card to a mobile device, and the identification card having a memory area including a network identification parameter of the subscriber for the mobile radio network;

storing the identification parameter and the system-specific identification protocol program in the memory area; and using the identification card to identify the subscriber in the other system, the system-specific identification protocol program introducing to the other system the identification parameter according to a system-specific identification protocol.

31. The method according to claim 30, wherein the using includes encrypting the identification parameter.

32. The method according to claim 30, wherein the using includes accessing the identification parameter through the contact area.

33. The method according to claim 30, wherein the using includes accessing the identification parameter through an induction coil of the identification card.

34. The method according to claim 30, wherein the using includes accessing the identification parameter through an infrared interface of the at least one mobile device.

* * * * *